United States Patent [19]

Freda

[11] 4,071,488
[45] Jan. 31, 1978

[54] LATEX COMPOSITION
[75] Inventor: George B. Freda, Belpre, Ohio
[73] Assignee: Uniroyal, Inc., New York, N.Y.
[21] Appl. No.: 89,881
[22] Filed: Feb. 16, 1961
[51] Int. Cl.² ............................................. C08L 91/00
[52] U.S. Cl. ........................... 260/23.7 A; 260/29.7 E; 260/29.7 N; 260/32.6 A; 260/33.2 R
[58] Field of Search ................. 260/33.2, 29.7 N, 404, 260/23.7, 29.7 E, 32.6 A, 33.2 R; 44/7

[56] References Cited
U.S. PATENT DOCUMENTS

| 2,460,600 | 2/1949 | Sarbach | 260/32.6 |
| 2,474,776 | 6/1949 | Campbell | 260/32.6 |
| 2,789,040 | 4/1957 | Goff et al. | 44/7 |
| 2,823,193 | 2/1958 | Buckmann | 260/32.6 |
| 2,881,060 | 4/1959 | Linn | 44/7 |
| 2,966,401 | 12/1960 | Myerholtz | 44/7 |

Primary Examiner—Leland A. Sebastian
Attorney, Agent, or Firm—James J. Long

EXEMPLARY CLAIM

1. A latex composition comprising 100 parts of a rubbery polymer selected from the group consisting of polybutadiene and copolymers of butadiene with up to 50% by weight of styrene, 30–60 parts of formamide, and 5–30 parts of N-(ethylene oxide substituted) amide of oleic acid containing about 10 moles of ethylene oxide per mole of amide, the said parts being by weight.

2 Claims, No Drawings

LATEX COMPOSITION

This invention relates to improved rubber latex compositions for use as thickening agents in gasoline, said compositions being characterized by superior stability at low temperatures.

The essential components of my improved latex compositions are (1) a rubbery polymer consisting of from 50 to 100 parts butadiene and correspondingly from 50 to 0 parts styrene, (2) formamide and water, preferably in a ratio of 60 parts formamide to 40 parts water, (3) a long chain fatty amide with ethylene oxide substituted on the nitrogen atom. (All parts, percentages and ratios herein are by weight).

Heretofore latex compositions employed as thickeners for gasoline in the preparation of so-called "jellied gasoline" have displayed poor low temperature characteristics, i.e., these latices freeze when their temperatures are lowered below 0° C. and coagulate when they are subsequently melted. This behavior totally destroys their utility for the purpose intended.

The addition of formamide (usually in amount of from about 30 to 60 parts per 100 parts of rubber hydrocarbon) to latices greatly lowers their freezing point. Latices containing formamide, when the formamide/water ratio is 60/40, remain pourable at temperatures as low as −35° C. These improved latices are still however not entirely satisfactory at low temperatures. It has been observed that they are deficient in what might be called "freeze-thaw" stability, i.e. the ability to withstand alternate freezing and thawing without coagulating.

I have now found that this poor freeze-thaw stability can be vastly improved by the addition thereto of a long-chain fatty amide having ethylene oxide substituted on the chain at the nitrogen atom, usually in amount of from about 5 to 30 parts per 100 parts of rubber hydrocarbon. An example of such an additive suitable for use in my invention is Antarox G-100 which is N-(ethylene oxide substituted) amide of oleic acid containing on the average about 10 moles of ethylene oxide per mole of the amide, made by Antara Chemical Division of General Dyestuff Corporation. It is made by adding ethylene oxide to the amide under the influence of a basic catalyst such as sodium or potassium hydroxide, according to methods well known in the art. Another commercially available material which has a similar composition is Ethomid RO/20, made by Armour & Co.

In practicing the invention it is preferred to employ the formamide and water in a ratio of 60 parts formamide to 40 parts water, because the 60/40 ratio is the eutectic mixture and gives the lowest freezing point. Small deviations from the 60/40 formamide/water ratio are permissible but only at a sacrifice in freezing point.

The following examples illustrate the process of making the new latices of my invention.

EXAMPLE I

The latex of my invention is prepared by taking 135 parts of polybutadiene latex (GR-S X-711, 40% total solids, 37% rubber hydrocarbon by wt.) and adding thereto 21 parts of formamide and 10 parts of Antarox G-100. 67 parts of water are then removed from this composition by evaporation, leaving a latex comprising the following:

|  | Parts by wt. |
| --- | --- |
| Rubber hydrocarbn | 50 |
| Formamide | 21 |
| Antarox G-100 | 10 |
| Water | 14 |

This latex is fluid down to about −35° C. at which point it loses it pourability, i.e. it freezes. When the latex is cooled to −65° C. and then allowed to return to a temperature above −35° C. it will be observed that it retains its pourability, does not coagulate and is apparently unchanged. This may be compared with a latex compound having substantially the same ratio of ingredients but to which no substituted amide has been added. Such a latex is fluid down to about −35° C. but when cooled to below this temperature and then allowed to return to a temperature above −35° C. it rapidly coagulates. This illustrates the advantage obtained by using the composition of my invention over those recipes heretofore employed.

EXAMPLE II

A latex similar to that of Example I was prepared in accordance with the process of my invention using GR-S X-711 coupled with formamide and Antarox G-100. This latex was added to gasoline containing 1% of a non-ionic wetting agent (based on the weight of the gasoline), e.g., "Tween 60", polyoxyethylene sorbitan monostearate manufactured by the Atlas Powder Co. The resultant jellied gasoline contained about 6% rubber hydrocarbon (based on the weight of the gasoline plus latex composition). It was suitable for use as an incendiary gel. The presence of the formamide and the long chain substituted amide did not interfere with the normal functioning of the resulting incendiary gel.

Useful gels may be prepared having rubber hydrocarbon contents of from about 6 to 10% (based on the weight of the gasoline plus latex composition) in gasoline containing from 0.1 to 5% (based on the weight of the gasoline) of conventional non-ionic wetting agents. It is not intended to limit the process of my invention by these amounts.

Other latices have been prepared in accordance with the process of my invention starting with GR-S X-710 (70 butadiene-30 styrene copolymer), GR-S X-667 (84 butadiene-16 styrene), and GR-S X-758 (70 butadiene-30 styrene). These latices when compounded in accordance with the processes of my invention all exhibit good low temperature properties.

In general, I have found that the advantages of my invention may be obtained when from 5 to 30 parts of the long chain substituted amide per hundred parts of hydrocarbon is employed.

Having thus described my invention, what I claim and desire to protect by Letters Patent is:

1. A latex composition comprising 100 parts of a rubbery polymer selected from the group consisting of polybutadiene and copolymers of butadiene with up to 50% by weight of styrene, 30–60 parts of formamide, and 5–30 parts of N-(ethylene oxide substituted) amide of oleic acid containing about 10 moles of ethylene oxide per mole of amide, the said parts being by weight.

2. A latex composition as in claim 1 in which the weight ratio of formamide to water in the latex is 60/40.